(12) United States Patent
Loui et al.

(10) Patent No.: US 7,110,025 B1
(45) Date of Patent: Sep. 19, 2006

(54) DIGITAL CAMERA FOR CAPTURING A SEQUENCE OF FULL AND REDUCED RESOLUTION DIGITAL IMAGES AND STORING MOTION AND STILL DIGITAL IMAGE DATA

(75) Inventors: Alexander C. Loui, Penfield, NY (US); Kenneth A. Parulski, Rochester, NY (US); Thomas N. Berarducci, Webster, NY (US); William M. Jackson, Victor, NY (US); Rajan L. Joshi, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 1117 days.

(21) Appl. No.: 09/685,998

(22) Filed: Oct. 11, 2000

Related U.S. Application Data

(63) Continuation-in-part of application No. 09/606,513, filed on Jun. 29, 2000, now Pat. No. 6,937,273, which is a continuation of application No. 08/864,403, filed on May 28, 1997, now abandoned.

(51) Int. Cl.
  *H04N 5/225* (2006.01)
  *H04N 7/26* (2006.01)
  *H04N 5/76* (2006.01)

(52) U.S. Cl. .................. 348/220.1; 386/120; 386/111

(58) Field of Classification Search .......... 348/220.1, 348/333.05, 333.11, 333.12; 386/117, 120, 386/121
See application file for complete search history.

(56) References Cited

U.S. PATENT DOCUMENTS

| 5,164,831 | A | | 11/1992 | Kuchta et al. |
| 5,382,974 | A | | 1/1995 | Soeda et al. |
| 5,440,343 | A | | 8/1995 | Parulski et al. |
| 5,444,482 | A | * | 8/1995 | Misawa et al. .......... 348/220.1 |
| 5,929,916 | A | * | 7/1999 | Legall et al. .......... 375/240.05 |
| 5,937,136 | A | | 8/1999 | Sato |
| 5,982,984 | A | | 11/1999 | Inuiya |
| 6,005,613 | A | | 12/1999 | Endsley et al. |
| 6,005,679 | A | | 12/1999 | Haneda |
| 6,038,257 | A | * | 3/2000 | Brusewitz et al. ..... 375/240.21 |
| 6,061,497 | A | | 5/2000 | Sasaki |
| 6,101,276 | A | * | 8/2000 | Adiletta et al. ............. 382/236 |
| 6,104,752 | A | * | 8/2000 | Yamagishi .................. 375/240 |
| 6,208,691 | B1 | * | 3/2001 | Balakrishnan et al. . 375/240.12 |
| 6,693,960 | B1 | * | 2/2004 | Ito et al. ................. 375/240.11 |

* cited by examiner

*Primary Examiner*—Thai Tran
*Assistant Examiner*—Heather R. Jones
(74) *Attorney, Agent, or Firm*—Pamela R. Crocker

(57) ABSTRACT

A method for simultaneously recording motion and still images, includes the steps of: capturing a motion image sequence and accompanying audio of a scene with a digital video camera adapted to record both motion and higher resolution still images; simultaneously capturing a still image sequence having a higher resolution and lower frame rate than the motion capture sequence; compressing the motion image sequence using interframe compression and the accompanying audio and storing the compressed motion image and audio data; and compressing the still images using intraframe coding and storing the compressed still image data.

7 Claims, 5 Drawing Sheets

DIGITAL CAMERA FOR CAPTURING A SEQUENCE OF FULL AND REDUCED RESOLUTION DIGITAL IMAGES AND STORING MOTION AND STILL DIGITAL IMAGE DATA

CROSS REFERENCE TO RELATED APPLICATIONS

This is a continuation-in-part of U.S. Ser. No. 09/606,513, filed Jun. 29, 2000 now U.S. Pat. No. 6,937,273 by Loui entitled Integrated Motion-Still Capture System With Indexing Capability, which is a continuation of U.S. Ser. No. 08/864,403, filed May 28, 1997 now abandoned by Loui entitled Integrated Motion-Still Capture System With Indexing Capability.

FIELD OF THE INVENTION

The invention relates generally to the field of photography, and in particular to combine motion and still image capture. More specifically, the invention relates to a motion/still image capture system which captures image sequences including both full and reduced resolution images and stores digital image data to provide both motion video sequences and digital still pictures.

BACKGROUND OF THE INVENTION

Currently, it is common for consumers to use camcorders to capture motion video images, which are viewed on a TV display, and film cameras to capture still images which are developed and optically printed to provide hardcopy prints. Carrying both types of devices is burdensome, however. Thus, there is interest in having a digital camcorder type device that captures motion images, while also allowing high quality prints to be produced from selected image frames.

Recent advances in digital camcorders include the ability to capture both motion and still images (commonly referred to as MOST cameras), and associated audio information, such as those from JVC (GR-DV1) and Sony Corp. (DCR-PC7) which allow the capture of motion video and still imagery. For example, the GR-DV1 from JVC allows a user to capture a snapshot while recording live video. Basically, the snapshot is indicated by overlaying a white border on the particular still frame of the captured live video. See U.S. Pat. No. 5,382,974, issued Jan. 17, 1995 to Soeda et al. entitled Movie Camera Having Still Picture Photographing Function and Method of Photographing Still Picture Therewith, which shows a movie camera capable of also capturing still images. Although these cameras allow one to capture motion and still images, they do not provide adequate still image quality. Furthermore, the user must decide before taking the picture whether a still or motion type image is desired. Often, the user would like to have both a motion video sequence and a still image of the same event (e.g. their daughter scoring the winning soccer goal). This is difficult to do with these prior art systems, where the user must press a special button to obtain a "still" image, rather than deciding at a later time what images they would like to have as high resolution prints.

A high definition camcorder could store a high resolution (e.g. 1280×960 pixels) motion sequence for each image frame, to provide higher quality still images. However, to produce good motion rendition of high speed objects, a high frame rate (e.g. 30 frames/sec) is required. The amount of data that would need to be processed and stored per second (e.g. 1280×960×30 pixels) would be excessive, requiring a high cost, power-hungry design having a limited recording time.

There is a need therefore for a digital motion/still camera design that reduces the processing and storage requirements, while providing both good motion rendition and the ability to obtain high resolution prints from any desired scene after it has been captured.

SUMMARY OF THE INVENTION

The need is met according to the present invention by providing a method for simultaneously recording motion and still images, that includes the steps of: capturing a motion image sequence and accompanying audio of a scene with a digital video camera, adapted to record both motion and higher resolution still images; simultaneously capturing a still image sequence having a higher resolution and lower frame rate than the motion capture sequence; compressing the motion image sequence using interframe compression and the accompanying audio and storing the compressed motion image and audio data; and compressing the still images using intraframe coding and storing the compressed still image data.

ADVANTAGEOUS EFFECT OF THE INVENTION

The present invention provides a better way of capturing, processing, and storing both motion and still images of the same event. Another advantage of this invention is that it records both still and motion images so that desired still images can later be selected for printing. Another advantage of this invention is that it uses the same image sensor and digital image processor to provide both the motion and still images. Another advantage of this invention is that the still image processing does not need to be completed within the period set by the capture frame rate, so that the processor pixel operating rate can be reduced by balancing the processor load for still and motion images.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
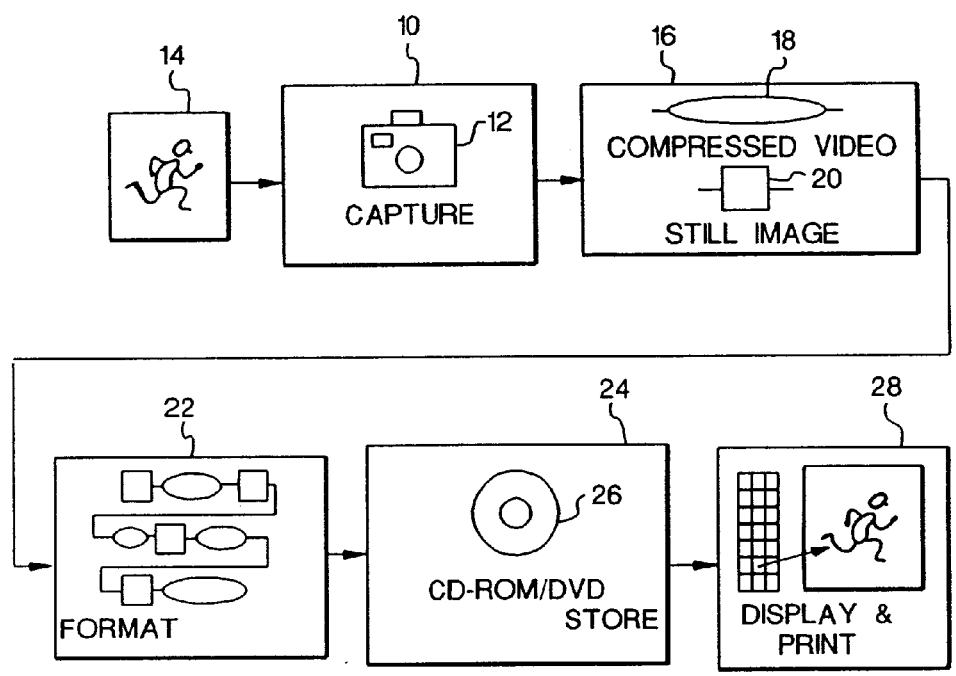
FIG. 1 is a flow chart showing the operation of the motion/still imaging system according to the present invention.

Referring to FIG. 1, the operation of the system of the present invention will be described. In a capture step 10, a motion/still camera 12 is operated in a motion/still capture mode, to alternately capture a series of both full resolution and reduced resolution images of a subject 14 while continuously capturing a digital audio signal. According to the present invention, a full resolution image contains at least four times as many pixels as a reduced resolution image. Alternatively, the user can change the camera mode using user controls 66 (see FIG. 3) to capture only reduced resolution motion images, or only a single full resolution still image. Both the full and reduced resolution images are digitized 16 in the camera. The reduced resolution images, and a similar sized low resolution image derived from the full resolution images, are compressed 18 using an interframe compression algorithm operating at a relatively high compression ratio, while the full resolution images 20 are compressed using only intraframe compression at a relatively low compression ratio, to provide high image quality. The high resolution image compression can either use as an input the complete full resolution image, or can alternatively compress the difference image (e.g. the residual image) obtained by decompressing and subtracting the low resolution image to be stored as part of the compressed low resolution sequence from the full resolution image of the same image frame.

Compression of the motion sequence is necessary to lower the bandwidth and storage requirements. For instance, an NTSC format video signal with a frame rate of 29.97 Hz when digitized will result in an uncompressed bit rate of about 168 Mb/s. MPEG (Moving Picture Expert Group) compression of an NTSC video signal can result in a bit rate of 3 to 6 Mb/s with a quality comparable to analog cable TV and far superior to VHS video tape. The full resolution images used to provide high quality still images are obtained much less frequently than the motion images, and have higher resolution and less aggressive compression. A regular sequence of high resolution still image frames and low resolution compressed audio/video frames is generated 22. Such a sequence is created whenever the user presses the record button while the camera 12 is in the combination motion/still (MOST) mode. The camera 12 takes a fixed number of images per second (e.g. 24 or 30 frames per second) to provide the motion sequence. A relatively small number of these images (e.g. 2 frames per second, or every $12^{th}$ or $15^{th}$ image) are normally full resolution images, while the others are reduced resolution images. The user can set the frequency of full resolution images using user controls 66, in order to record more high resolution images per second for important but short events, or alternatively fewer high resolution images per second, to reduce the amount of still image related data that must be recorded, in order to increase the recording time.

The full and reduced resolution images can be created using the image sensor described in commonly-assigned U.S. Pat. No. 5,440,343 issued Aug. 8, 1995 to Parulski et al., entitled Motion/Still Electronic Image Sensing Apparatus, the disclosure of which is incorporated herein. Alternatively, the image sensor can always read out a full resolution image using a relatively high speed clock, and the reduced resolution images can be obtained by averaging or subsampling (e.g. decimating the image 2:1 both vertically and horizontally) this full resolution image sequence.

The low resolution video data and high resolution image data can be stored 24 on a digital storage medium, such as CD ROM medium or a DVD (Digital Versatile Disk) medium 26. Alternatively, the data can be stored on digital videotape, a magnetic hard drive, or Flash EPROM memory, or any other digital storage device. Alternatively, the data can be stored on an image server through a wireless or wired network link. The stored data may also include metadata, such as user-input text information and camera-generated information such as time, date, camera model and serial number, lens settings, etc.

The structure of the image files that store the low resolution motion video and high resolution still image data are described below. The display and printing of these digital image files 28 are carried out at a user's video player terminal (which may utilize the digital camera 12 for image playback) or computer, and are enabled by an image processing sub-system in the terminal or computer that decompresses the image files. Through the terminal or computer, the user can view and browse the low resolution video sequences, and selectively print any associated high resolution still frames.

Figure 2:
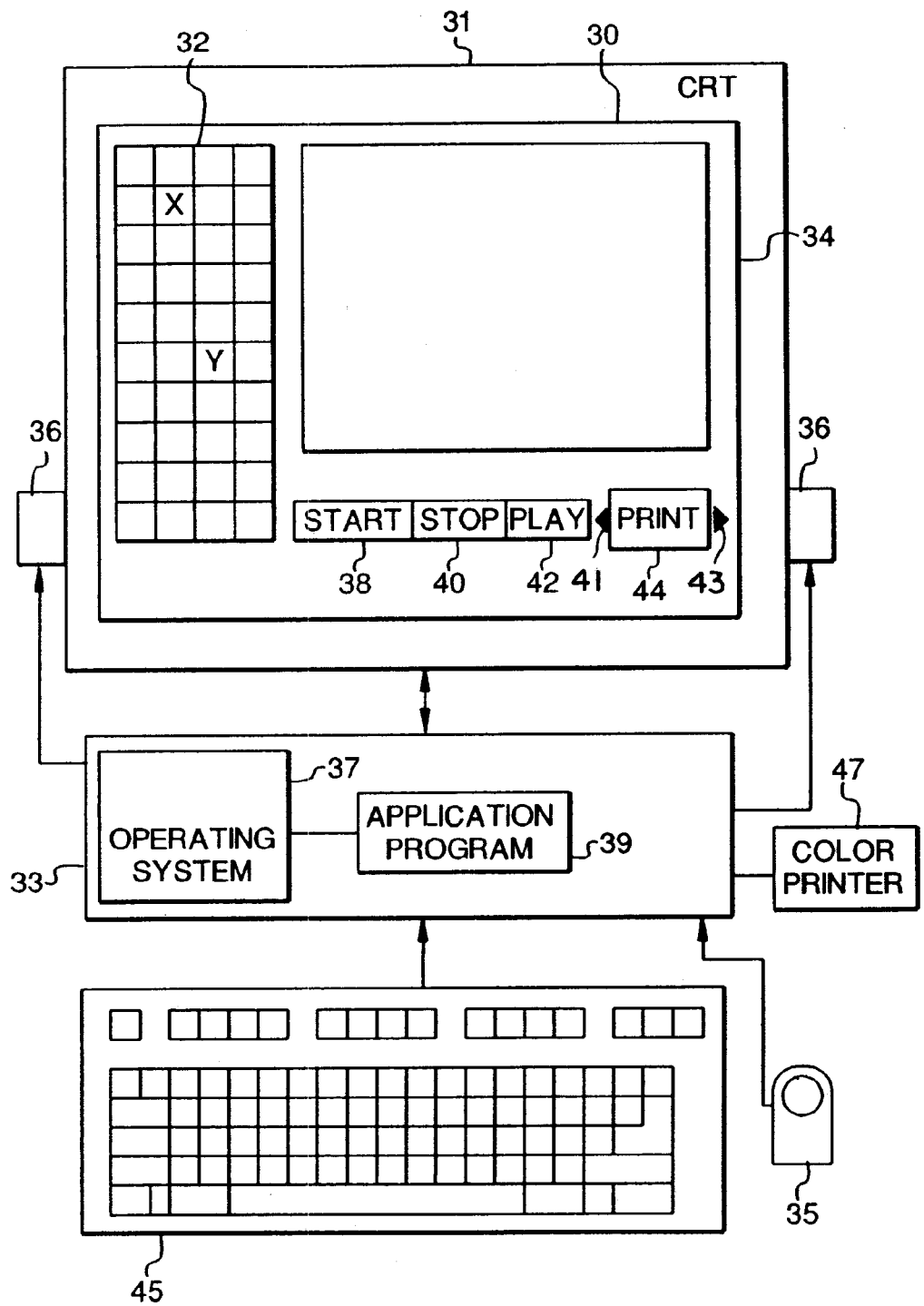
FIG. 2 shows the user interface employed in the motion/still imaging system of the present invention.

A user interface of the terminal or computer is depicted in FIG. 2. The user interface 30 is displayed on a CRT 31 driven by the terminal or computer, which may be, for example, a personal computer (PC) 33, having an operating system 37, such as the well-known Windows 98™, or Windows 2000™ operating systems from Microsoft, Inc., Redmond, Oreg., and application software 39 for generating the graphical user interface and performing the image processing, decoding and display functions described herein. The PC 33 is connected to operator interfaces such as a keyboard 45 and a mouse 35. The basic features of the interface display 30 include an array of index images 32 representing each motion sequence. Using a mouse 35, an operator can double click on one of the index images 32 to display the associated audiovisual segment, which may be, for example, an MPEG-2 compliant audio/video file, in window 34. The MPEG-2 video compression is defined in "Generic coding of moving pictures and associated audio information: Video," *ISO/IEC* 13818-2, *MPEG-2 Video International Standard*, 1996. Alternatively, other types of MPEG compression, such as MPEG-1 or MPEG-4, may be used. The audio portion of the MPEG segment is played on the stereo speakers 36. Using the mouse 35, the operator can drag and drop any one of the index images into a start window 38 and another one later in the sequence into a stop window 40. When the operator clicks on the "PLAY" button 42, the MPEG sequences associated with the start and stop sequences, and all sequences in between, will be played in window 34.

While any sequence is playing, the operator can single click on the print button 44 to initiate a printing operation. When the print button is depressed, the image frame corresponding to the last high resolution image is displayed in window 34. The user can skip back to the previous high resolution image by single clinking on the back arrow 41, or can rapidly move to earlier high resolution images by "clicking and holding" forward arrow 43. Similarly, the user can skip forward to the next high resolution image by single clicking on the forward arrow 43, or can rapidly move to later high resolution images by "clicking and holding" back arrow 41. When the user double-clicks on the print button 44, a print is produced from the high resolution still image data for this image frame on a color printer 47 such as an ink jet or laser printer, that is connected to the user's terminal or personal computer 33.

Figure 3:
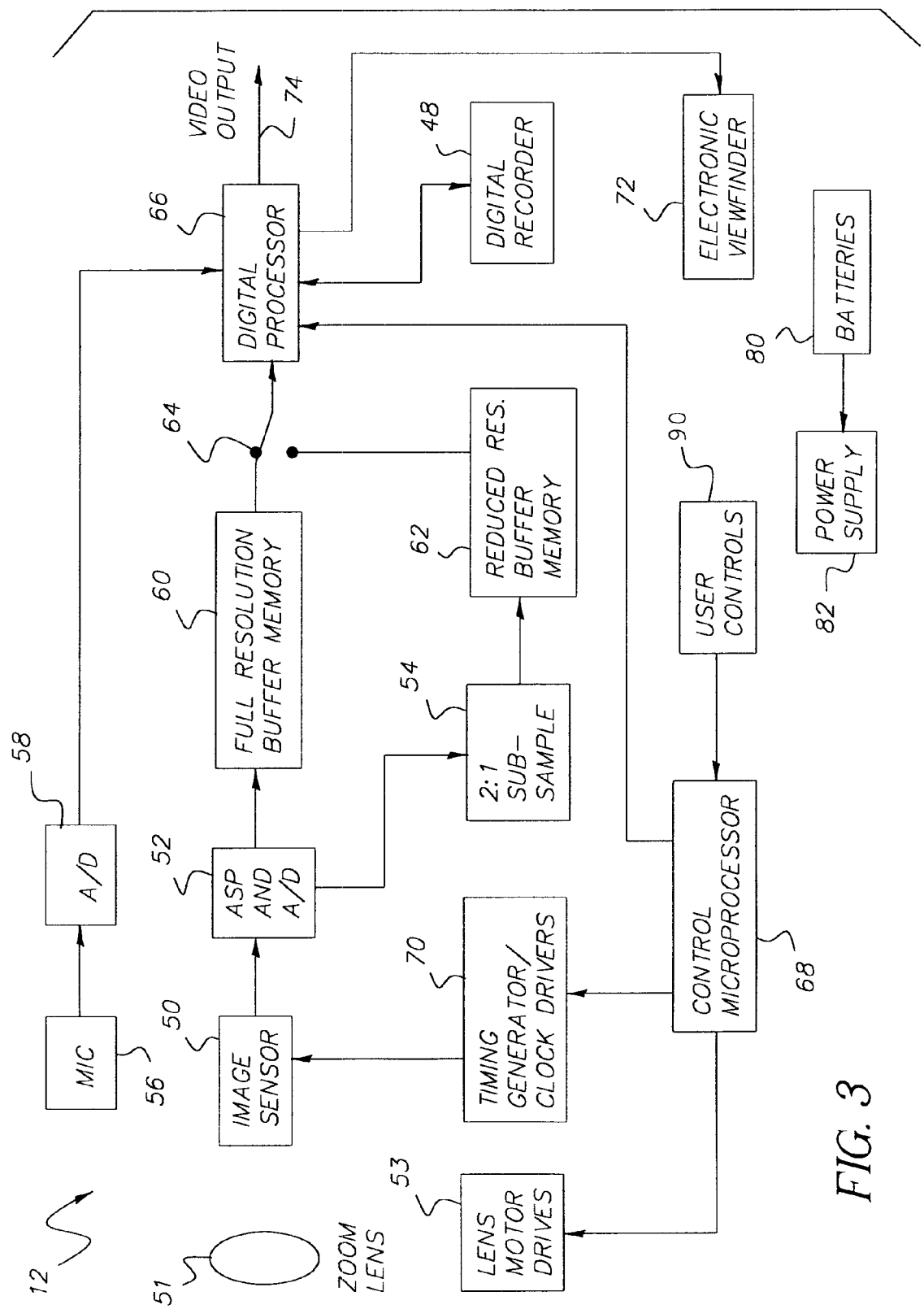
FIG. 3 is a block diagram illustrating a motion/still image capture system according to the present invention.

The architecture of the digital motion/still camera 12 is illustrated in FIG. 3. The digital camera 12 produces digital image files that are recorded using a digital recorder 48. The camera is powered by batteries 80 which connect to power supply 82, which supplies power to the camera circuits depicted in FIG. 3. The digital camera 12 includes a zoom lens 51 having zoom and focus motor drives 53 and an adjustable aperture (not shown). The user composes the scene using the electronic viewfinder 72 and the zoom lens control buttons (not shown) of the user controls 90, and then depresses a record button (not shown) to begin capture of a motion/still image sequence. The zoom lens 51 focuses light from a subject 14 (see FIG. 1) on an image sensor 50, for example, a single-chip interline color CCD image sensor using the well-known Bayer color filter pattern. The image sensor may be an interline format sensor having 1280 columns×960 rows of active pixels. The image sensor 50 is controlled by timing generator/clock drivers 70. The zoom and focus motors 53 and the clock drivers 70 are controlled by control signals supplied by a control microprocessor 68. The analog output signal from the image sensor 50 is amplified and converted to digital data by the analog signal processing (ASP) and analog-to-digital (A/D) converter circuit 52. The camera 12 also includes a microphone 56 and an audio A/D converter 58 or providing a digital audio signal to digital processor 66.

The digital data from ASP and A/D 52 includes both full resolution image frames that are used to produce both high resolution still image data and a low resolution motion image data, and reduced resolution image frames that are only used to provide low resolution motion image data. As described earlier, the image sensor 50 can use the invention described in U.S. Pat. No. 5,440,343 to provide full resolution (e.g. 1280×960 pixel) images and reduced resolution (e.g. 640×480 pixel) images by summing and dumping appropriate color pixels. Alternatively, the sensor can provide only full resolution (e.g. 1280×960 pixel) images, and a 2:1 subsampling circuit 54 can be used to produce the reduced resolution image by appropriately averaging the digital sensor pixel values. The ASP and A/D 52 is coupled to a full resolution buffer memory 60 which stores a full resolution (e.g. 1280×960 pixel) still image. The 2:1 subsampling circuit 54 is coupled to a multi-frame reduced resolution buffer memory 62, which can store multiple reduced resolution images, such as buffer memory that can store four 640×480 pixel images.

The outputs of the full resolution buffer memory 60 and the multi-frame reduced resolution buffer memory 62 are coupled to a multiplexer switch 64 which provides an input to digital processor 66. The digital audio data from audio A/D 58 is also input to digital processor 66. The processed image and audio data is coupled to a digital recorder 48 which stores the digital image files. The digital recorder can use write-once or erasable CD or DVD optical disks. Alternatively, the digital recorder can use other digital storage technologies, such as magnetic hard drives, magnetic tape, optical tape, or solid-state memory.

The control microprocessor 68 alternates between processing one full resolution image from full resolution buffer memory 60, followed by several reduced resolution images from multi-frame reduced resolution buffer memory 62. As will be described later in reference to FIG. 4, since the full resolution images have more pixel data (e.g. 4 times as many pixels) than the reduced resolution images, the processor spends a longer period of time processing a full resolution image than it does processing a reduced resolution image, while the time period between each sensor exposure must remain constant, in order to prevent motion artifacts. Therefore, the arrangement of the two buffer memories 60 and 62 allows the processing load to be better balanced by allowing the control microprocessor 68 to spend a longer period of time processing the full resolution images.

For each full and reduced resolution image frame, the control microprocessor 68 performs color interpolation followed by color and tone correction, in order to produce rendered sRGB image data. For full resolution frames, the control microprocessor 68 creates both full resolution (e.g. 1280×960 pixel) sRGB image data, and low resolution (e.g. 640×480 pixel) sRGB image data. For reduced resolution frames, the digital processor creates only low resolution (e.g. 640×480 pixel) sRGB data. The control microprocessor 68 also creates, from the low resolution image data of each full and reduced resolution image frame, a "thumbnail" size image, which can be created as described in commonly-assigned U.S. Pat. No. 5,164,831 issued Nov. 17, 1992 to Kuchta et al., entitled Electronic Still Camera Providing Multi-Format Storage of Full and Reduced Resolution Images, the disclosure of which is herein incorporated by reference. This thumbnail image has 160×120 pixels and is displayed on electronic viewfinder 72 as the image sequences are captured. The digital processor 66 can also provide a video output signal 74, as either a digital or analog video signal, which is encoded for display on a standard TV display (not shown), such as an NTSC video display. The digital processor also compresses the digital audio signal from audio A/D 52, in order to provide an MPEG compressed audio stream.

The rendered sRGB low resolution image data from both the full and reduced resolution frames is then compressed, processed and stored, along with the compressed audio data, as an MPEG-2 bitstream. The processing may include conversion form RGB data to alternate color spaces, such as YUV, YIQ, or Y, Cb, Cr as described in chapter 3 of "Video Demystified" by Keith Jack, published by HighText Interactive Inc., SanDiego, Calif. copyright 1996. In the MPEG-2 standard, frames are designated I, P or B. I indicating that the frame is intra-coded (the encoding is not dependent on any other frame); P indicating the frame is predicted from the previous frame; and B indicating that the frame is predicted from both the previous and future frames. In one embodiment of the present invention, the low resolution image frames derived by subsampling the full resolution image frames are preferably compressed as I frames. This is because each I frame can be decoded as a low resolution image, so that the full resolution image data can be stored as the difference between this I frame low resolution image and the full resolution image.

The rendered sRGB full resolution image data from the full resolution frames is also compressed and stored to provide high resolution still image data. In one embodiment, the difference (residual) between the sRGB full resolution image data, and the upsampled low resolution I frame image decompressed from the MPEG-2 bitstream is computed, and then compressed and stored as a complete still image file. To recover the full resolution still image data, the residual still image file and the corresponding MPEG-2 I frame are both decompressed and combined. In an second embodiment, the full resolution still image data is JPEG compressed and stored as a complete still image file. The MPEG-2 and still image files can store metadata, such as the date and time the picture was captured, the lens f/number and other camera settings, and image captions or comments that can be selected or entered by the camera user.

Figure 4:
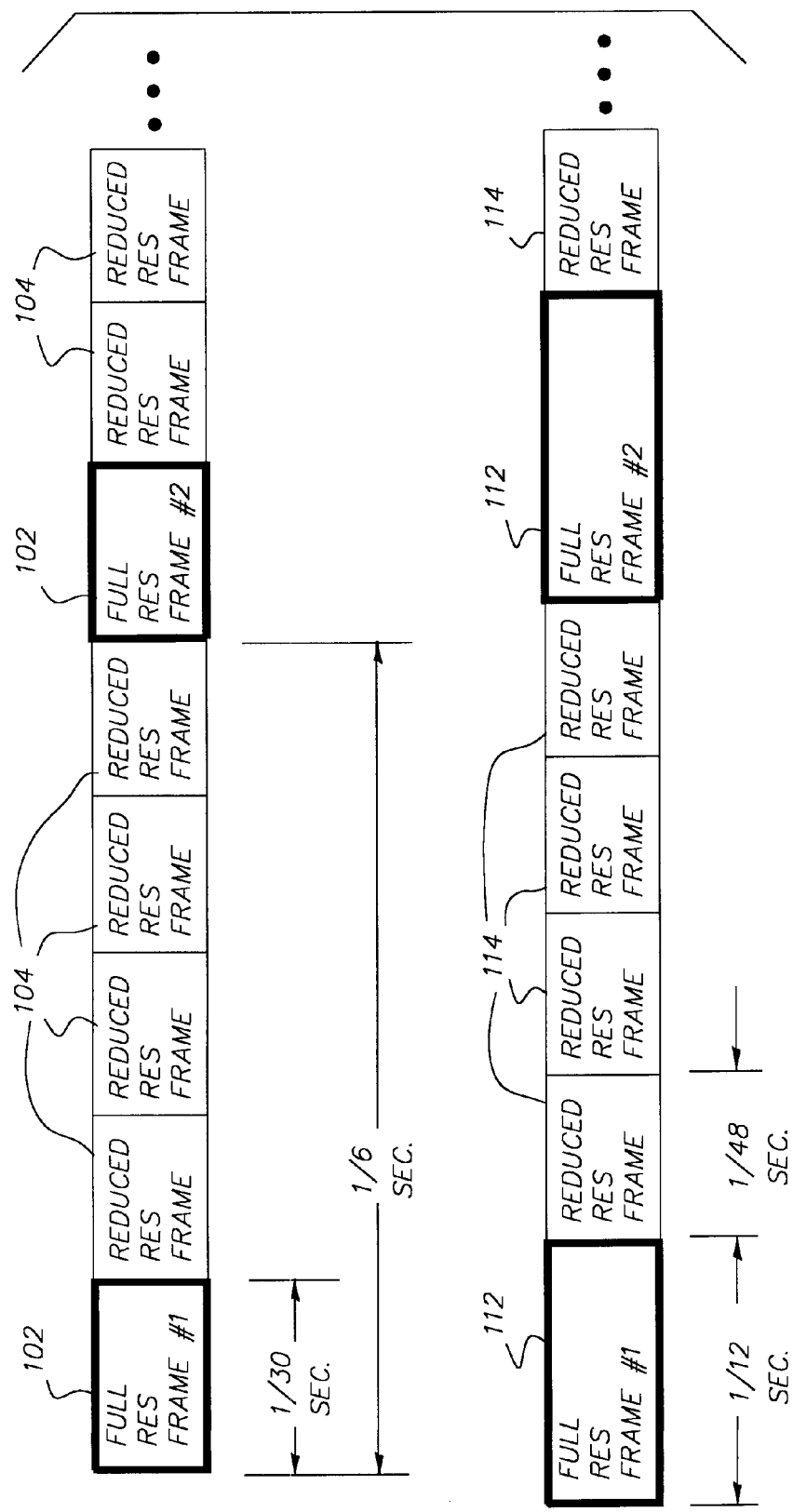
FIG. 4 is a diagram illustrating the motion capture and processing sequence used in the present invention.

The motion capture and processing sequence used in the digital camera 12 of the present invention will now be described with reference to FIG. 4, and the structure of the digital files stored by the digital recorder 48 of the present invention will now be described with reference to FIG. 5. The capture sequence shown in FIG. 4 shows that a new image is captured every ⅟30 second, and that the capture sequence has provided one high resolution frame 102, followed by four low resolution frames 104, so that a high resolution frame is captured every 1/6 of a second. Thus, there are 4 low resolution frames in between each full resolution frame. Alternatively, other ratios of low to full resolution frames can be used, and the digital camera 12 can include user controls 66 to allow the user to set this ratio, and to set the capture sequence frame rate to a value other than 30 frames per second.

In conventional camcorders, the processing time for each video frame is equal to one frame period. In the present invention, however, the processing time for the full resolution frames is set to be substantially longer than the processing time for the reduced resolution frames. As shown in FIG. 4, the processing time for each full resolution frame 112 may be 1/12 second, which is four times as long as the 1/48 second processing time for each reduced resolution frame 114. Thus, the control microprocessor 68 is allocated more time to create and compress the sRGB still images for the full resolution frames as well as create and MPEG-2 compress the low resolution image data. For the reduced resolution frames, the digital processor needs less time, since it is only processing and MPEG-2 compressing the low resolution image data.

Figure 5:
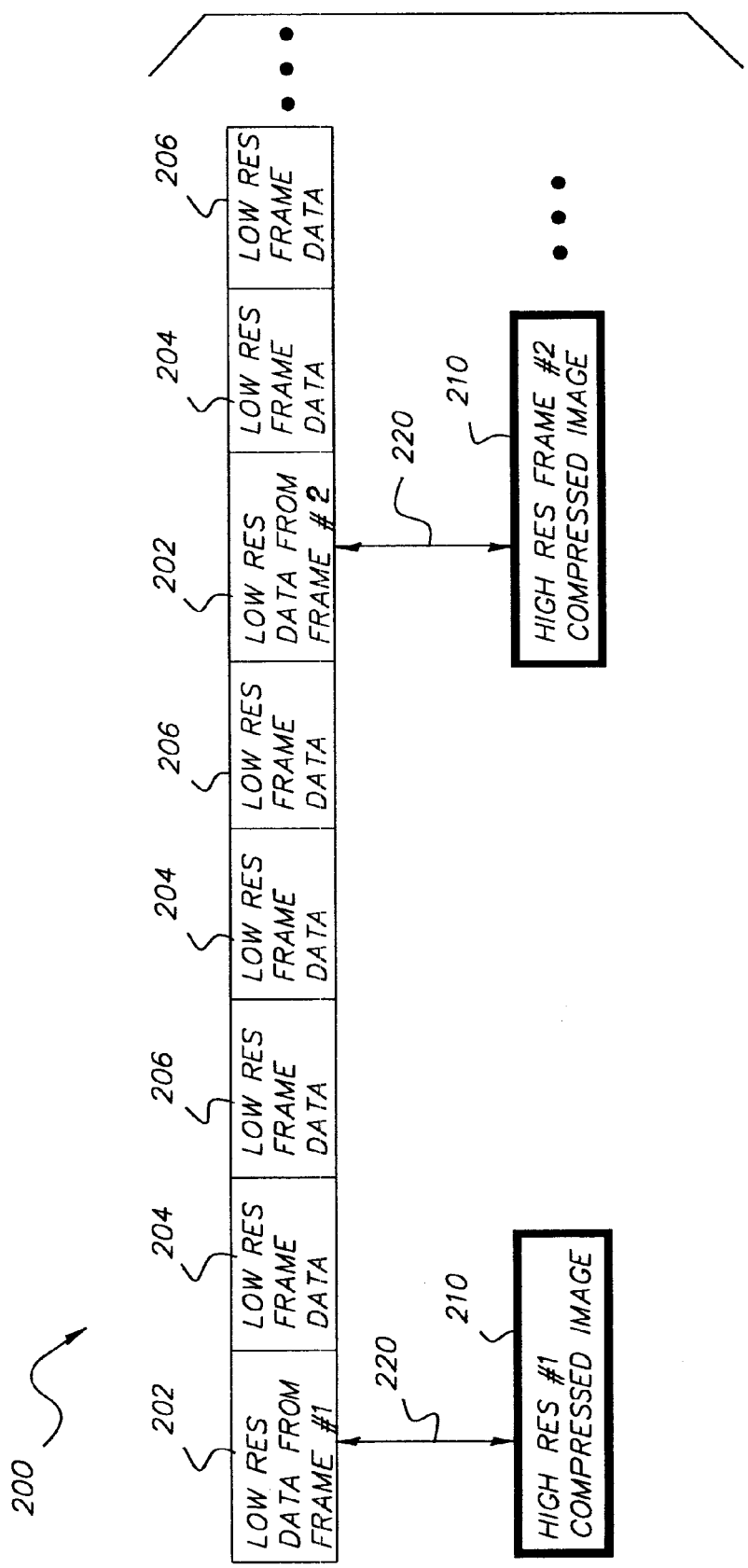
FIG. 5 is a diagram illustrating the data structure for storing the motion sequences and still images.

As shown in FIG. 5, the stored image files for each captured image sequence include an MPEG-2 sequence bitstream 200 and a number of high resolution compressed image files 210 which are used to provide high resolution still images. Pointers 220 relate each high resolution compressed image file to a particular I frame 202 from the MPEG-2 motion sequence. The pointers 220 may be provided by metadata in the MPEG-2 bitstream that provides an identifier of the appropriate high resolution compressed image file 210 associated with each I frame 202. Alternately, the pointers 220 may be provided by comparing the exact time recorded in the metadata of both the MPEG-2 bitstream for each I frame 202 and also recorded in each high resolution compressed image file 210, or by using a separate synchronization file.

The MPEG-2 frames corresponding to the reduced resolution frames 104 (see FIG. 4) are compressed either as B frames 204 or as P frames 206, rather than as I frames. As stated earlier, I indicates that the frame is intra-coded, P indicates the frame is predicted from the previous frame; and B indicates that the frame is predicted from both the previous and future frames.

The invention has been described with reference to a preferred embodiment. However, it will be appreciated that variations and modifications can be effected by a person of ordinary skill in the art without departing from the scope of the invention.

PARTS LIST 10 capture step x
12 motion/still camera x
14 photographic subject x
16 digitize step x
18 compress video step x
20 full resolution image x
22 generate sequence x
24 storage step x
26 writable medium x
28 display, review and print step x
30 user interface display x
31 CRT x
32 array of index images x
33 personal computer x
34 playback window x
25 mouse x
36 stereo speakers x
37 operating system x
38 start window x
39 application software x
40 stop window x
41 back arrow x
42 play button x
43 forward arrow x
44 print button x
45 keyboard x
47 color printer x
48 digital recorder x
50 image sensor x
51 zoom lens x
52 video A/D converter x
53 zoom and focus motor drives x
54 2:1 subsampler x
56 microphone x
58 audio A/D converter x
60 full resolution buffer memory x
62 reduced resolution buffer memory x
64 multiplexer switch x
66 digital processor
68 control microprocessor x
70 timing circuit x
72 electronic viewfinder x
74 video output signal x
80 batteries x
82 power supply x
90 user controls
102 high resolution frame x
104 low resolution frame x
112 processing time for high resolution frame x
114 processing time for low resolution frame x
200 MPEG-2 bitstream x
202 I frame x
204 B frame x
206 P frame x
210 high resolution compressed image files x
220 pointer x

The invention claimed is:

1. A digital motion/still camera comprising:
   a) an image sensor for providing a sequence of image frames;
   b) means for automatically providing a repeating sequence of full resolution image frames regularly interspersed between reduced resolution image frames, wherein the full resolution image frames represent images with more pixels than are represented by the reduced resolution image frames;
   c) a first image buffer for storing at least one full resolution frame of pixel values;
   d) a second image buffer for storing a plurality of reduced resolution frames of pixel values; and
   e) a digital recorder coupled to the first and second image buffers for storing a repeating sequence of full and reduced resolution frames of pixel values.

2. The digital motion/still camera of claim 1, wherein the repeating sequence has a single full resolution frame followed by a plurality of low resolution frames.

3. The digital motion/still camera of claim 1, wherein the full resolution image is stored using a low resolution component stored as part of a motion sequence, and a full resolution component.

4. The digital motion/still camera of claim 1, wherein the apparatus further includes a processor coupled to the first image memory, that processes the stored full resolution frames prior to recording, and produces from a full resolution image frame both a low resolution frame and a high resolution image frame.

5. The digital motion/still camera of claim 4, wherein the processing period for the still image is longer than the capture frame period.

6. The digital motion/still camera of claim 5, wherein the processor also processes the reduced resolution frames in a processing period that is shorter than the capture frame period.

7. The digital motion/still camera of claim 1, further comprising a control for allowing the operator to set the number of full resolution frames to be captured per second.

* * * * *